United States Patent [19]

Gagliani et al.

[11] 4,425,441

[45] Jan. 10, 1984

[54] CLOSED CELL POLYIMIDE FOAMS AND METHODS OF MAKING SAME

[76] Inventors: John Gagliani, 6280 Lance Pl., San Diego, Calif. 92120; John V. Long, 1756 Lexington Pl., El Cajon, Calif. 92021

[21] Appl. No.: 465,514

[22] Filed: Feb. 10, 1983

Related U.S. Application Data

[62] Division of Ser. No. 423,802, Sep. 27, 1982.

[51] Int. Cl.³ .......................... B01J 13/02; B29D 9/00
[52] U.S. Cl. ...................................... 521/56; 264/46.4; 264/46.5; 521/180; 521/183; 521/184; 521/185; 521/189
[58] Field of Search ................. 521/56, 180, 183, 184, 521/185, 189; 264/46.4, 46.5

[56] References Cited

U.S. PATENT DOCUMENTS 4,355,120 10/1982 Gagliani et al. ...................... 521/189
4,360,604 11/1982 Gagliani et al. ...................... 521/189
4,361,453 11/1982 Gagliani et al. ...................... 521/189

*Primary Examiner*—Morton Foelak

*Attorney, Agent, or Firm*—Frank D. Gilliam

[57] ABSTRACT

A high temperature and flame resistant closed cell polyimide foam material and methods of making the foam. An aromatic tetracarboxylic acid dianhydride is reacted with an oxomine to produce an N-substituted imide, which is then esterified with a suitable alcohol. The resulting liquid is dried and the dry residue is reduced to a uniform powder having particles with diameters generally in the 0.5 to 10 mm. range. The powder is preferably further dried, either before or after final size reduction, in a moderate vacuum at moderate temperature to remove any excess residual alcohol. The powder spontaneously expands to form a closed cell foam when heated to a temperature in the range of about 90° to 150° C. for a suitable period. When the powder is expanded in a closed mold, a well consolidated, uniform, closed cell foam product results. When expanded in an unrestricted manner, closed cell "macroballoons" having average diameters between about 0.4 to 15 mm. result. The closed cell foam produced has excellent flexibility and resistance to heat and flame, and does not shrink appreciably when exposed to flame.

6 Claims, No Drawings

CLOSED CELL POLYIMIDE FOAMS AND METHODS OF MAKING SAME

This is a division, of application Ser. No. 423,802, filed Sept. 27, 1982.

BACKGROUND OF THE INVENTION

This invention relates in general to polyimide foams and, more specifically, to closed cell polyimide foams having improved flame resistance.

A number of polyimide compositions having excellent flame resistance and utility as coatings and adhesives are described and claimed in U.S. Pat. Nos. 4,161,477, 4,183,838 and 4,183,139, granted to John Gagliani, one of the inventors of the invention claimed in this application.

The coating and adhesive compositions described in the above-mentioned prior patents are made by first preparing a suitable bisimide by reacting an aromatic tetracarboxylic acid dianhydride with a cyclic amide or oxoimine. The ratio of oxoimine to dianhydride is preferably in the 2.3:1 to 2.7:1 range and the imidization reaction is preferably conducted at a temperature of 170°–200° C. for 20–60 minutes.

The polyimide forming material is then prepared by dissolving the bisimide in an inert solvent; then adding thereto a suitable diamine, producing a viscous fluid containing an intimate, upolymerized mixture of N-substituted cyclic bisimide dicarboxylic acid and diamine which is capable of being converted to a high molecular weight polymer by the application of heat.

The solution is coated onto a surface and polymerized by heating to a temperature in the 177°–316° C. range for 30 minutes to 5 hours. The following is exemplary of the exchange reaction which occurs:

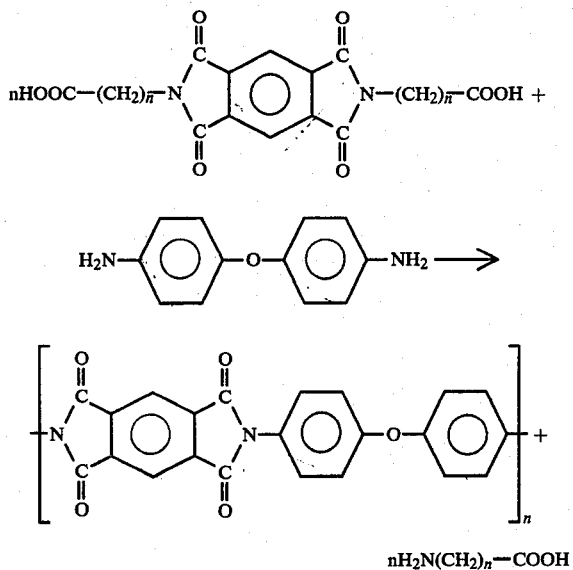

where n is a positive integer.

The resulting coating is tough, highly adherent to various surfaces, with very few pinholes or bubbles. It has excellent peel strength and is resistant to high temperatures, peeling and abrasion.

The prior coating material, however, was not suitable for use in applications requiring a cellular or foam material, since conventional agitation foaming and addition of known blowing agents add to process costs and complexity and are not entirely effective at the relatively high polymerization temperature required.

Co-pending U.S. Patent Application Ser. No. 390,778, filed June 21, 1982, by the inventors of the present application, discloses and claims methods of making modified polyimide/polyimide-amide open cell foams and the product thereof.

In that method, the reaction of an oxoimine with an aromatic dianhydride in a mole ratio of from about 0.05:1 to 1.5:1 produces an N-substituted aliphatic monoimide which is then esterified with a suitable reactive solvent. A suitable diamine is added and the liquid is dried to a film or powder. The dry material spontaneously expands into a consolidated open cell foam when heated to a temperature in the range of about 230° to 320° C. At the lower end of this temperature range, a primarily polyimide-amide foam results, while toward the high end of the range the foam is primarily a polyimide. Flexibility, flame resistance and other physical characteristics vary with the proportions of the two polymers in the final product.

While this open cell foam is excellent for many applications, and can have physical properties tailored for specific purposes, it is not optimum for certain uses. The open cell foam tends to shrink when exposed to flame or high heat. It may absorb water or other liquids and is permeable to liquids and gases. Also, the relatively high foaming temperatures require more complex and expensive heating equipment and the process is wasteful of energy.

Thus, there is a continuing need for a closed cell foam having a combination of flame and heat resistance, resistance to flame-induced shrinking, flexibility and resistance to penetration by liquids and gases. Also, there is a need for reductions in process complexity and energy consumption.

SUMMARY OF THE INVENTION

The above problems, and others, are overcome by a process having some similarities to those of the above-mentioned patents and application, which, however, produces a flexible, high temperature and flame shrinkage resistant closed cell polyimide foam. While the reactions which occur are complex and not fully understood, it appears that under the polymerization reaction conditions described below, the polymer produced is primarily a polyimide with a portion of polyimide-amide. For the purposes of this application the resin, for simplicity, will be identified as a polyimide.

The basic steps in producing our closed cell polyimide foam are reacting an oxoimine with an aromatic tetracarboxylic acid dianhydride in a mole ratio of about 0.05:1 to 1.5:1 to produce an N-substituted imide; esterifying the imide with a reactive solvent; adding thereto a suitable diamine; drying the liquid to a non-tacky, handleable material; reducing the dry material to a powder having average particle diameters of from about 0.5 to 10 mm.; and heating the powder to a temperature of about 90° to 150° C. for a suitable period to produce closed cell foam by spontaneous foaming and polymerization. Preferably, a step of further drying the material at a moderate temperature and a partial vacuum is performed just before or after the powder size reduction step to remove any remaining excess solvent.

DETAILED DESCRIPTION OF THE INVENTION

Either a consolidated, uniform closed cell shaped foam product or a number of macroballoons or beads may be produced, depending on whether full foaming is restrained or unrestrained. Macroballoons can be produced in diameters ranging from about 0.4 to 15 mm. by unrestrained foaming, e.g., on a flat open surface or through feeding the powder into a flowing hot air stream. For best macroballoons, the powder size should be toward the smaller end of the preferred 0.5 to 10 mm. general size range. The macroballoons have utility per se, such as for packing material or fillers in other casting resins. Also, they can be consolidated in molds under moderate pressure with further heating and/or the addition of adhesives. To directly form consolidated structures, the powder is charged into a closed mold. Generally, the powder expands to about 50 times its original volume. While an excess of powder may be used to assure complete mold filling, a great excess, such as 100% excess, should be avoided since we have found that a mixture of open and closed cell foam may result. The exact optimum quantity of powder to use with a specific mold can be easily determined by trial-and-error tests. In general, a mold fill of from about 2 to 3 percent by volume gives excellent results.

Any suitable aromatic dianhydride may be used in the preparation of the desired imides. Typical aromatic dianhydrides include those described and referenced in the patents listed above. Due to their ready availability at reasonable prices and the excellent foams which result, pyromellitic dianhydride and 3,3', 4,4' benzophenone tetracarboxylic acid dianhydride (BTDA) are preferred.

Any suitable oxoimine may be reacted with the selected dianhydride to produce the desired imide. Preferably, the oxoimine has the general formula:

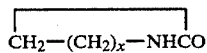

where "x" is a positive integer from 2 to 4. Of these, best results are apparently obtained with caprolactam.

While any suitable reaction conditions may be used, we have obtained the best results where the dianhydride is added to the oxoimine and the mixture is heated to about 150°–200° C. until imidization is complete, about 5–90 minutes. Optimum results have been obtained at about 170°–180° C. for about 30 minutes.

In order to produce a superior foaming material, we have found that it is essential that the mole ratio of oxoimine to dianhydride be in the range of about 0.05:1 to 1.5:1. Above this range, the material forms a coating without foaming, while below this range excessively rigid material is produced. Within this range optimum results occur with a mole ratio of oxoimine to dianhydride of about 0.5 to 1.0.

The imides produced by the above reaction have the general formula:

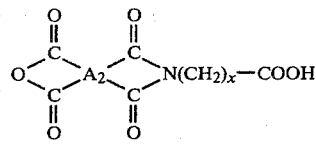

wherein "x" is an integer from 2 to 4 and "$A_2$" is selected from the group consisting of:

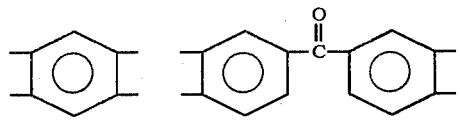

and mixtures thereof.

The imide thus produced is then esterified by dissolving it in a suitable reactive solvent at a suitable temperature. Any suitable reactive solvent which acts as an esterifying agent may be used. Typical of these are aliphatic alcohols having up to 7 carbon atoms and aromatic alcohols, which may have halogen or amino substitutions, and mixtures thereof.

We have found that best results are obtained with alcohols having boiling points between about 75° and 100° C. Lower boiling alcohols are too reactive and higher boiling alcohols require excessively high processing conditions to dry the resin. Optimum results are obtained with isopropyl alcohol, although good results are also obtained with ethyl alcohol and, especially, secondary alcohols having low reactivity and boiling points in the above-mentioned range.

The esterification reaction takes place as follows:

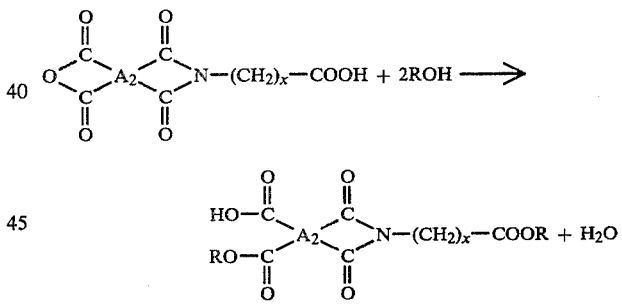

wherein "x" is an integer from 2 to 4, "$A_2$" is as listed for the imide above and "R" is an aliphatic or aromatic radical which may have halogen or amino substitutions. This esterification may take place under any suitable conditions. Typically, a mole ratio of imide to esterifying agent of from about 1:8 to 1:15 is preferred to assure rapid esterification at reflux temperature. This solution is heated to reflux (about 70°–90° C.) until clear, which takes about 60–90 minutes.

Once the esterification is complete, the selected diamine or diamines are added to the solution. Preferably, an approximately stoichiometric quantity of diamine is used.

Any suitable diamine may be used. Typical diamines include meta-phenylene diamine, para-phenylene diamine; 4,4'-diaminodiphenyl ether, 4,4'-diaminodiphenyl sulfone, 3,3'-diaminodiphenyl sulfone, 4,4'-diaminodiphenyl sulfide, 4,4'-diaminodiphenyl methane, 3,3' diaminodiphenyl methane and mixtures thereof. Of these, best results are obtained with 4,4'-diaminodiphenyl methane which is, therefore, preferred. If desired, aliphatic diamines may be used in combination with these aromatic diamines. Typical aliphatic diamines include 1,3 diaminopropane, 1,4 diamino butane, 1,6-diaminohexane, 1,8-diaminooctane, 1,12 diaminododecane and mixtures thereof.

Additives to improve various characteristics of the final foam may be added as desired. Any appropriate additives may be used, such as fillers, surfactants and fire retardants to improve product characteristics.

Surfactants (surface active agents) are particularly desirable where macroballoons are produced, since they tend to produce higher cell wall thicknesses and walls of greater resiliency.

Typical surfactants include Dow Corning Corp. 190 or 193, FC430 from Minnesota Mining & Manufacturing Co., Zonyl FSC from E. I. duPont de Nemours & Co., and L550 from Union Carbide Corp. While any suitable concentration may be used, from about 0.01 to 2% (by weight, based on the weight of the solution prior to drying) is preferred. Of these surfactants, best results have been obtained with Zonyl FSC. Fillers and reinforcing additives may be added prior to drying the resin. Typical fillers include Kevlar aramid fibers, graphite fibers, glass fibers, carbon and graphite powders, Teflon flurocarbon powders and mixtures thereof.

Fire retardants can be added to lower smoke emission, reduce flame spread and extend the burnthrough resistance of the products. Typical fire retardants, which may be typically used in amounts of about 2 to 50 wt. %, based on the weight of the final foam, include Firebake ZB, aluminum trihydrate, antimony oxide and mixtures thereof.

The solution is then dried by any suitable method. Simply heating the solution in an oven to a temperature of about 65°-95° C. until dry is satisfactory. Other conventional methods, such as spray drying, rotary drying, thin film evaporation, etc. may be used as desired. The resulting free-flowing powder or flakes are non-tacky and may be stored indefinitely at room temperature.

We have found that in order to produce uniform closed cell foam it is essential that the foaming powder be in the 0.5 to 10 mm. average particle diameter range. Best results are obtained with particle diameters in the 1.0 to 5.0 mm. range. If the drying process did not produce particles in the desired range, the powder should be ground or pulverized to produce the desired particle size. Typically, the powder may be reduced in size by mechanical grinding.

The resulting free flowing powder is suitable for the production of closed cell foam. However, for best results with greatest cell uniformity and maximum closed cells, it is often preferred that the powder be further dried (either before or after reduction to the final particle size) at a before or after reduction to the final particle size) at a moderate temperature in a moderate vacuum. Best results are obtained if the powder is dried for about 30 to 120 minutes at about 50° to 80° C. at a pressure of about 25 to 29 inches of mercury.

The final step in converting the powder into a foam is accomplished by heating the powder to the selected foaming temperature for a suitable period.

The reaction which takes place is quite complex, since it is a combined condensation and exchange reaction. The reactions which are believed to take place are detailed in our copending U.S. patent application Ser. No. 390,778, filed June 2, 1982. Heating the powder to a temperature of about 90° to 150° C. for about 10 to 60 minutes causes the powder to expand approximately 50 times in volume, producing a uniform, resilient closed cell foam which appears to be a mixture of polyimide and polyimide-amide polymers. When foamed in a closed mold, using about 2 to 3 volume percent (based on mold volume) powder, a well consolidated foam product results. When foamed without volume restraint, individual macroballoons and/or agglomerations of macroballoons result. The foam produced is tough, resilient and will not shrink appreciably or emit significant smoke or toxic by-products when exposed to open flame.

Details of the invention will be further understood upon reference to the following examples, which describe preferred embodiments of the methods and compositions of this invention. All parts and percentages are by weight, unless otherwise indicated.

EXAMPLE I

About 515.5 g. (1.6 M) of 3,3',4,4'-benzophenone-tetracarboxylic acid dianhydride (BTDA) and about 45.2 g. (0.4 M) caprolactam are placed in a three liter flask and heated to about 175° C. After about 30 minutes at this temperature the mixture is cooled to about 70° C. and about 965 g. of isopropanol is added. This mixture is heated to reflux temperature (about 90° C.). Reflux is continued until the mixture appears clear, about 70 minutes. The mixture is cooled to just below about 70° C. and about 317.12 g. (1.6 M) 4,4'-diaminodiphenyl methane is added. This mixture is refluxed (at about 90° C. for about 15 minutes, then is cooled to room temperature and coated onto aluminum foil. The coating is dried overnight at about 82° C. The brittle product is crushed and placed in a vacuum oven at about 82° C. for about 30 minutes at a pressure of about 27 in. Hg. The powder is then further crushed to an average (and fairly uniform) particle size of about 3 mm. A mold, preheated to about 110° C. is opened, about 2.5 volume percent of the powder is placed therein and the mold is closed. After about 30 minutes at this temperature, the mold is opened and a consolidated, closed cell foam product is removed. The product is found to be resistant to flame and to not shrink appreciably when exposed to direct flame.

EXAMPLE II

The procedure of Example I is repeated four additional times, varying only the particle size of the powder heated in the mold. Where Example I used an average particle diameter of about 3 mm., these additional experiments use average particle diameters of about: II(a) 0.1 mm., II(b) 0.5 mm., II(c) 10 mm., and II(d) 15 mm. The foam produced in II(a) is a mixture of open and closed cell foam having poor physical properties. Examples II(b) and II(c) produce good closed cell foams, while II(d) produces foam with large, irregular closed cells giving a non-uniform foam with lower uniformity and resiliency. Thus, foaming powder particle sizes in the 0.5 to 10 mm. range are preferred for good closed cell foam, with best results around the 3 mm. size of Example I.

EXAMPLE III

The experiment of Example I is repeated except that the vacuum drying step is omitted. The final foam is a mixture of open-cell and closed-cell foams due to the excess of solvent present in the powder.

EXAMPLE IV

The procedures of Example I are repeated, except that the second drying step using a partial vacuum is performed after the final particle size reduction, rather than before. The foam produced is substantially identical to that produced in Example I.

EXAMPLE V

The procedures of Example I are repeated, except that in place of isopropanol, the following solvents are used: III(a) ethanol (Boiling Point 78.5° C.), III(b) aminoethyl alcohol (B.P. 172.2° C.), III(c) 2-fluoro ethanol (B.P. 103.35° C.), III(d) methyl alcohol (B.P. 42° C.), III(e) benzene (B.P. 80° C.0, and III(f) acetone (B.P. 56.5° C.). Excellent results are obtained with the alcohols having boiling points in the 75° to 110° C. range (Examples III(a) and III(c)). The higher boiling alcohol of Example III(b) produces poor results due to difficulty in adequately drying the powder. The lower boiling alcohol of Example III(d) is too reactive and produces poor foam. The inert solvents of Examples III(e) and III(f) do not act as esterifying agents and fail to produce a foam.

EXAMPLE VI

Five samples are prepared as described in Example I up to the heating to foam step. The five powder samples are placed in preheated circulating air ovens at the following temperatures for the following time periods: VI(a) about 125° C. for about 40 min., VI(b) about 210° C. for about 30 min., VI(c) about 250° C. for about 50 min., VI(d) about 280° C. for about 20 minutes and VI(e) about 380° C. for about 20 min. The samples of Examples VI(b), VI(c) and VI(d) all produce foam having excellent physical properties. The foam of Example VI(a) is not fully expanded and cured. The sample of Example VI(e) shows a mixture of open-cell and closed-cell foams due to the high temperature of foaming.

EXAMPLE VII

The procedures of Example I are repeated four additional times, varying only the quantity of caprolactam used. Where Example I used about 45.2 g. (0.4 M) of caprolactam to give a molar ratio of caprolactam to BDTA (515.5 g., 1.6 M) of about 0.25:1, these four additional experiments use caprolactam quantities of about: VII(a) 180.8 g. (1.6 M, 1:1 ratio), VII(b) 220.8 g. (2.0 M, 1.25:1 ratio), VII(c) 271 g. (2.4 M, 1.5:1 ratio), and VII(d) 361.6 g. (3.2 M, 2:1 ratio). The foam produced in experiments VII(a) and VII(b) have excellent foam rise characteristics, while that produced in VII(c) has low foam rise and the sample of VII(d) does not foam. This demonstrates that ratios of oxoimine to dianhydride in the 0.05:1 to 1.5:1 range are necessary for the production of good quality foam.

EXAMPLE VIII

The experiment of Example I is repeated, except that the following diamines are used in place of the 4,4'-diamino-diphenyl methane: VIII(a) m-phenylene diamine (0.375 M), VIII(b) 4,4'-diaminodiphenyl sulfone (0.375 M), VIII(c) 4,4'-diaminodiphenyl oxide (0.1875 M), and 4,4'-diaminodiphenyl sulfide (0.1875 M). In each case the resulting foam has a uniform cellular structure and has excellent heat and flame resistance. The flexibility and resiliency varies somewhat among the sub-examples.

EXAMPLE IX

The procedure of Example I is repeated with the only change being the substitution of the following oxoimines for the 0.4 M caprolactam specified in Example I: IX(a) 2-pyrrolidone (0.4 M), IX(b) 2-piperidone (0.4 M), IX(c) caprolactam (0.2 M) and 2-piperidone (0.2 M). The product in each case is an excellent flame resistant foam, with slight changes in physical properties with the different oxoimines.

EXAMPLE X

The experiment of Example I is repeated with four additional samples with the addition of the following agents to the liquid just prior to the first drying step: X(a) about 0.5 wt. % (based on solids) Zonyl FSB (available from E. I. duPont deNemours), X(b) about 1.0 wt. % Corning 190 (available from Dow Corning Corp.) X(c) about 43 g. of very finely divided aluminum hydroxide and X(d) about 60 g. of about 0.25 inch graphite fibers. The samples having the surfactants (Examples X(a) and X(b)) are found to have increased resiliency, while the filler of Example X(c) produces somewhat brittle foams and the reinforcing fibers of Example X(d) results in greater foam strength.

EXAMPLE XI

The steps of Example I are repeated except for the drying steps. The liquid is sprayed into a chamber preheated to about 75° C. using a high speed atomizer. By carefully adjusting the atomizer, particles in the desired size range are produced. Larger particles are ground to the desired size range where necessary. Samples of the spray dried powder are foamed as described in Example I with and without the second moderate vacuum, drying step. While both samples produce good foam, the second drying is found to result in foam having slightly better physical properties.

EXAMPLE XII

Powder samples prepared by the procedures of Example I and Example XI are sprayed into a moving hot air stream maintained at about 300° C. The particles are found to spontaneously expand into macraballoons which flow with the air stream to a collector.

EXAMPLE XIII

The experiments of Example XII are repeated, except that about 20 g. of Zonyl FSB surfactant is added to the liquid prior to drying. The macraballoons obtained using the surfactant have slightly thicker walls and greater resiliency.

EXAMPLE XIV

Macroballoons produced by the methods of Example XIII are mixed with just enough of the liquid of Example I (at the pre-drying stage) to wet the macraballoons. The mixture is packed into a mold preheated to about 260° C.. After about 30 minutes, the consolidated article is removed from the mold. The macraballoons are solidly bonded together by the cured resin. The liquid appears to have polymerized without significant additional foaming.

EXAMPLE XV

A quantity of macroballoons produced in Example XIII are placed in a mold which is slightly overfilled. The mold is closed, applying about 0.5 to 1.0 psig on the macroballoons. The mold is maintained at about 370° C. for about 15 minutes. A consolidated closed cell structure results with the macroballoons adhering well to each other.

EXAMPLE XVI

The experiments of Example I are repeated with four additional samples with the addition of the following agents to the liquid just prior to the initial drying step: XVI(a) about 5 wt. % aluminum trihydrate (based on solids); XVI(b) about 30 wt. % aluminum trihydrate (based on solids); XVI(c) about 10 wt. % antimony trioxide; and XVI(d) about 15 wt. % Firebake ZB. Processing is continued as described in Example I. Each of these foam samples, plus a sample of foam produced in Example I is exposed to a direct flame. Those samples of XVI which includes a fire retardant are found to produce less smoke, have slower flame spread and to have a greater resistance to burn through than the sample of Example I.

EXAMPLE XVII

Samples of foamable powder are prepared as described in Example I. Three mold set-ups are prepared as follows: two sheets of material (as specified below) are temporarily adhered to rigid backing and arranged in a facing arrangement, spaced about 0.25 inch apart with the foamable powder uniformly spread over one sheet. The powder occupies about 5% of the volume between the spaced sheets. In these tests, in XVII(a) uses two sheets of aluminum foil, XVII(b) uses two sheets of cured polycarbonate resin and XVII(c) uses one sheet of phenolic resin and one sheet of aluminum foil. In each case, the sheets and powder are heated to about 120° C. for about 40 minutes, cooled to room temperature, and removed from the rigid backing. In each case a well bonded composite sandwich of foam between the outer sheets results. The test of XVII(a) is repeated with the sheets pressed together to a thickness of about 0.18 inch at a temperature of about 175° C., immediately after foaming. A higher density composite results.

EXAMPLE XVIII

Three aluminum honeycomb structures, each having a thickness of about 0.5 inches, overall dimensions of about 12 inches by 12 inches and honeycomb hexacon diameters if about 0.25 inch are provided. One honeycomb, XVIII(a) is partially filled (about 5% by volume) with a foamable powder prepared as described in Example I and two other honeycomb structures are entirely filled as follows: XVIII(b) with macroballoons prepared as described in Example XII and XVIII(c) with the mixture of macroballoons and liquid described in Example XIV. In each case, the honeycomb structure is held between two rigid mold surfaces and heated to about 250° C. for about 30 minutes. In each case, a strong structure with the foam/macroballoons bonded to the honeycomb results. The sample at XVIII(c) shows superior bonding.

Although specific components, proportions and conditions have been specified in the above examples, these may be varied with similar results, where suitable. In addition, other materials may be added to the foamable material, such as fillers, colorants, ultraviolet absorbers or the like.

Other applications, modifications and ramifications of the present invention will occur to those skilled in the art upon reading the present disclosure. These are intended to be included within the scope of the invention as defined in the appended claims.

We claim:

1. A process for producing high temperature and flame resistant closed cell foam structure formed by the following process steps:

reacting an oxoimine having the general formula

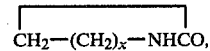

where "x" is a positive integer from 2 to 4, with an aromatic tetracarboxylic acid dianhydride in a mole ratio thereof between about 0.05:1 and 1.5:1 to produce an N-substituted imide;

esterfying said N-substituted imide by mixing therewith a reactive solvent;

adding thereto at least one diamine;

drying the resulting liquid composition;

reducing the dried material to an average particle diameter of from about 0.5 to 10 mm.;

placing a suitable quantity of said particles into a honeycomb structure; and heating said particles to a temperature in the range of about 90° to 150° C.;

whereby said particles expand producing a closed cell foam of substantial uniform density throughout the honeycomb structure forming a high strength structure with cell foam bonded to the honeycomb results.

2. The process according to claim 1 including the further step of filling a honeycomb structure with said macroballoons, then heating said structure to a temperature sufficient to cause said macroballoons to bond to said honeycomb.

3. The process according to claim 1 including the further step of mixing said macroballoons with a portion of said liquid composition and heating the filled honeycomb to a temperature of about 90° to 150° C. to dry and cure said resin.

4. A process for producing high temperature and flame resistant closed cell foam structure formed by the following process steps:

reacting an oximine having the general formula

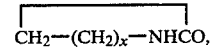

where "x" is a positive integer from 2 to 4, with an aromatic tetracarboxylic acid dianhydride in a mole ratio therof between 0.05:1 and 1.5:1 to produce an N-substituted imide;

esterfying said N-substituted imide by mixing therewith a reactive solvent;

adding thereto at least one diamine;

drying the resulting liquid composition;

reducing the dried material to an average particle diameter of from about 0.5 to 10 mm.;

placing a suitable quantity of said particles between spaced parallel sheets; and heating said particles to a temperature in the range of about 90° to 150° C.;

whereby said particles expand producing a composite closed cell foam layer of substantially uniform density bonded to said sheets.

5. The process according to claim 4 further including the step of compressing the bonded composite at a temperature of about 150° to 200° C. to increase density.

6. High temperature and flame resistant macroballoons produced by the following process steps:

reacting an oximine having the general formula

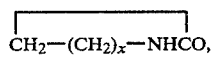

where "x" is a positive integer from 2 to 4, with an aromatic tetracarboxylic acid dianhydride in a mole ratio therof between 0.05:1 and 1.5:1 to produce and N-substituted imide;

esterfying said N-substituted imide by mixing therewith a reactive solvent;

adding thereto at least one diamine;

drying the resulting liquid composition;

reducing the dried material to an average particle diameter of from about 0.5 to 10 mm.; and foaming said particles by feeding them into a moving hot air stream, whereby discrete macroballoons are produced.

* * * * *